(12) United States Patent
Noda

(10) Patent No.: US 6,229,459 B1
(45) Date of Patent: May 8, 2001

(54) DATA CONVERTING METHOD AND APPARATUS THEREFOR

(75) Inventor: Chosaku Noda, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/392,291

(22) Filed: Sep. 8, 1999

(30) Foreign Application Priority Data

Sep. 29, 1998 (JP) .................................. 10-275358

(51) Int. Cl.⁷ ....................................... H03M 7/46
(52) U.S. Cl. ............................................... 341/59
(58) Field of Search ................... 341/59, 56, 57; 375/264

(56) References Cited

U.S. PATENT DOCUMENTS 6,150,964 * 11/2000 McLaughlin ........................... 341/59
6,157,325 * 12/2000 Kalman ................................. 341/59

* cited by examiner

Primary Examiner—Brian Young
(74) Attorney, Agent, or Firm—Pillsbury Winthrop LLP

(57) ABSTRACT

M-bit input data is converted into an n-bit code using a ROM storing a table having a code group in which the number of consecutive bits "0" between bits "1", the number of consecutive bits "0" on the start side, and the number of consecutive bits "0" on the end side are constrained. A code obtained via a bit inverter for inverting the last bit is input to an NRZI converter where bits "0" and "1" of an NRZI pattern are respectively cumulated as "−1" and "+1" to obtain a cumulated value (DSV) by a controller. The controller controls execution/nonexecution of inverse at an invertible position by the bit inverter for the last bit of the code so as to decrease the absolute value of DSV up to the next invertible position.

23 Claims, 11 Drawing Sheets

| NUMBER | BIT PATTERN | NUMBER | BIT PATTERN | NUMBER | BIT PATTERN |
|---|---|---|---|---|---|
| 1 | 000100000000 | 31 | 100000010000 | 341 | 100010100101 |
| 2 | 100100000000 | 32 | 010000010000 | 342 | 010010100101 |
| 3 | 010100000000 | 33 | 001000010000 | 343 | 001010100101 |
| 4 | 000010000000 | 34 | 101000010000 | 344 | 101010100101 |
| 5 | 100010000000 | 35 | 000100010000 | 345 | 000000010101 |
| 6 | 010010000000 | 36 | 100100010000 | 346 | 100000010101 |
| 7 | 001010000000 | 37 | 010100010000 | 347 | 010000010101 |
| 8 | 101010000000 | 38 | 000010010000 | 348 | 001000010101 |
| 9 | 000001000000 | 39 | 100010010000 | 349 | 101000010101 |
| 10 | 100001000000 | 40 | 010010010000 | 350 | 000100010101 |
| 11 | 010001000000 | 41 | 001010010000 | 351 | 100100010101 |
| 12 | 001001000000 | 42 | 101010010000 | 352 | 010100010101 |
| 13 | 101001000000 | 43 | 000001010000 | 353 | 000010010101 |
| 14 | 000101000000 | 44 | 100001010000 | 354 | 100010010101 |
| 15 | 100101000000 | 45 | 010001010000 | 355 | 010010010101 |
| 16 | 010101000000 | 46 | 001001010000 | 356 | 001010010101 |
| 17 | 000000100000 | 47 | 101001010000 | 357 | 101010010101 |
| 18 | 100000100000 | 48 | 000101010000 | 358 | 000001010101 |
| 19 | 010000100000 | 49 | 100101010000 | 359 | 100001010101 |
| 20 | 001000100000 | 50 | 010101010000 | 360 | 010001010101 |
| 21 | 101000100000 | 51 | 000000001000 | 361 | 001001010101 |
| 22 | 000100100000 | 52 | 100000001000 | 362 | 101001010101 |
| 23 | 100100100000 | 53 | 010000001000 | 363 | 000101010101 |
| 24 | 010100100000 | 54 | 001000001000 | 364 | 100101010101 |
| 25 | 000010100000 | 55 | 101000001000 | 365 | 010101010101 |
| 26 | 100010100000 | 56 | 000100001000 | | |
| 27 | 010010100000 | 57 | 100100001000 | | |
| 28 | 001010100000 | 58 | 010100001000 | | |
| 29 | 101010100000 | 59 | 000010001000 | | |
| 30 | 000000010000 | 60 | 100010001000 | | |

| NUMBER | BIT PATTERN | NUMBER | BIT PATTERN | NUMBER | BIT PATTERN |
|---|---|---|---|---|---|
| 1 | 000100000000 | 31 | 100000010000 | 341 | 100010100101 |
| 2 | 100100000000 | 32 | 010000010000 | 342 | 010010100101 |
| 3 | 010100000000 | 33 | 001000010000 | 343 | 001010100101 |
| 4 | 000010000000 | 34 | 101000010000 | 344 | 101010100101 |
| 5 | 100010000000 | 35 | 000100010000 | 345 | 000000010101 |
| 6 | 010010000000 | 36 | 100100010000 | 346 | 100000010101 |
| 7 | 001010000000 | 37 | 010100010000 | 347 | 010000010101 |
| 8 | 101010000000 | 38 | 000010010000 | 348 | 001000010101 |
| 9 | 000001000000 | 39 | 100010010000 | 349 | 101000010101 |
| 10 | 100001000000 | 40 | 010010010000 | 350 | 000100010101 |
| 11 | 010001000000 | 41 | 001010010000 | 351 | 100100010101 |
| 12 | 001001000000 | 42 | 101010010000 | 352 | 010100010101 |
| 13 | 101001000000 | 43 | 000001010000 | 353 | 000010010101 |
| 14 | 000101000000 | 44 | 100001010000 | 354 | 100010010101 |
| 15 | 100101000000 | 45 | 010001010000 | 355 | 010010010101 |
| 16 | 010101000000 | 46 | 001001010000 | 356 | 001010010101 |
| 17 | 000000100000 | 47 | 101001010000 | 357 | 101010010101 |
| 18 | 100000100000 | 48 | 000101010000 | 358 | 000001010101 |
| 19 | 010000100000 | 49 | 100101010000 | 359 | 100001010101 |
| 20 | 001000100000 | 50 | 010101010000 | 360 | 010001010101 |
| 21 | 101000100000 | 51 | 000000001000 | 361 | 001001010101 |
| 22 | 000100100000 | 52 | 100000001000 | 362 | 101001010101 |
| 23 | 100100100000 | 53 | 010000001000 | 363 | 000101010101 |
| 24 | 010100100000 | 54 | 001000001000 | 364 | 100101010101 |
| 25 | 000010100000 | 55 | 101000001000 | 365 | 010101010101 |
| 26 | 100010100000 | 56 | 000100001000 | | |
| 27 | 010010100000 | 57 | 100100001000 | | |
| 28 | 001010100000 | 58 | 010100001000 | | |
| 29 | 101010100000 | 59 | 000010001000 | | |
| 30 | 000000010000 | 60 | 100010001000 | | |

FIG.2

| NUMBER | MAIN CODE A | NUMBER | MAIN CODE A | NUMBER | MAIN CODE A |
|---|---|---|---|---|---|
| 1 | 000100000000 | 31 | 101000010000 | 181 | 000100001010 |
| 2 | 100100000000 | 32 | 000100010000 | 182 | 100100001010 |
| 3 | 010100000000 | 33 | 100100010000 | 183 | 010100001010 |
| 4 | 000010000000 | 34 | 010100010000 | 184 | 000010001010 |
| 5 | 100010000000 | 35 | 000010010000 | 185 | 100010001010 |
| 6 | 010010000000 | 36 | 100010010000 | 186 | 010010001010 |
| 7 | 001010000000 | 37 | 010010010000 | 187 | 001010001010 |
| 8 | 101010000000 | 38 | 001010010000 | 188 | 101010001010 |
| 9 | 100001000000 | 39 | 101010010000 | 189 | 100001001010 |
| 10 | 010001000000 | 40 | 100001010000 | 190 | 010001001010 |
| 11 | 001001000000 | 41 | 010001010000 | 191 | 001001001010 |
| 12 | 101001000000 | 42 | 001001010000 | 192 | 101001001010 |
| 13 | 000101000000 | 43 | 101001010000 | 193 | 000101001010 |
| 14 | 100101000000 | 44 | 000101010000 | 194 | 100101001010 |
| 15 | 010101000000 | 45 | 100101010000 | 195 | 010101001010 |
| 16 | 100000100000 | 46 | 010101010000 | 196 | 100000101010 |
| 17 | 010000100000 | 47 | 100000001000 | 197 | 010000101010 |
| 18 | 001000100000 | 48 | 010000001000 | 198 | 001000101010 |
| 19 | 101000100000 | 49 | 001000001000 | 199 | 101000101010 |
| 20 | 000100100000 | 50 | 101000001000 | 200 | 000100101010 |
| 21 | 100100100000 | 51 | 000100001000 | 201 | 100100101010 |
| 22 | 010100100000 | 52 | 100100001000 | 202 | 010100101010 |
| 23 | 000010100000 | 53 | 010100001000 | 203 | 000010101010 |
| 24 | 100010100000 | 54 | 000010001000 | 204 | 100010101010 |
| 25 | 010010100000 | 55 | 100010001000 | 205 | 010010101010 |
| 26 | 001010100000 | 56 | 010010001000 | 206 | 001010101010 |
| 27 | 101010100000 | 57 | 001010001000 | 207 | 101010101010 |
| 28 | 100000010000 | 58 | 101010001000 | | |
| 29 | 010000010000 | 59 | 100001001000 | | |
| 30 | 001000010000 | 60 | 010001001000 | | |

FIG. 3

| NUMBER | NORMAL CODE | INVERTED CODE |
|---|---|---|
| 1 | 0001000000000 | 000100000001 |
| 2 | 100100000000 | 100100000001 |
| 3 | 010100000000 | 010100000001 |
| 4 | 000010000000 | 000010000001 |
| 5 | 100010000000 | 100010000001 |
| 6 | 010010000000 | 010010000001 |
| 7 | 001010000000 | 001010000001 |
| 8 | 101010000000 | 101010000001 |
| 9 | 100001000000 | 100001000001 |
| 10 | 010001000000 | 010001000001 |
| 11 | 001001000000 | 001001000001 |
| 12 | 101001000000 | 101001000001 |
| 13 | 000101000000 | 000101000001 |
| 14 | 100101000000 | 100101000001 |
| 15 | 010101000000 | 010101000001 |
| 16 | 100000100000 | 100000100001 |
| 17 | 010000100000 | 010000100001 |
| 18 | 001000100000 | 001000100001 |
| 19 | 101000100000 | 101000100001 |
| 20 | 000100100000 | 000100100001 |
| 21 | 100100100000 | 100100100001 |
| 22 | 010100100000 | 010100100001 |
| 23 | 000010100000 | 000010100001 |
| 24 | 100010100000 | 100010100001 |
| 25 | 010010100000 | 010010100001 |
| 26 | 001010100000 | 001010100001 |
| 27 | 101010100000 | 101010100001 |

FIG.4

| NUMBER | MAIN CODE B | NUMBER | MAIN CODE B | NUMBER | MAIN CODE B |
|---|---|---|---|---|---|
| 1 | 001000000001 | 36 | 001001001001 | 71 | 010101000101 |
| 2 | 101000000001 | 37 | 101001001001 | 72 | 100000100101 |
| 3 | 100000010001 | 38 | 000101001001 | 73 | 010000100101 |
| 4 | 010000010001 | 39 | 100101001001 | 74 | 001000100101 |
| 5 | 001000010001 | 40 | 010101001001 | 75 | 101000100101 |
| 6 | 101000010001 | 41 | 100000101001 | 76 | 000100100101 |
| 7 | 000100010001 | 42 | 010000101001 | 77 | 100100100101 |
| 8 | 100100010001 | 43 | 001000101001 | 78 | 010100100101 |
| 9 | 010100010001 | 44 | 101000101001 | 79 | 000010100101 |
| 10 | 000010010001 | 45 | 000100101001 | 80 | 100010100101 |
| 11 | 100010010001 | 46 | 100100101001 | 81 | 010010100101 |
| 12 | 010010010001 | 47 | 010100101001 | 82 | 001010100101 |
| 13 | 001010010001 | 48 | 000010101001 | 83 | 101010100101 |
| 14 | 101010010001 | 49 | 100010101001 | 84 | 100000010101 |
| 15 | 100001010001 | 50 | 010010101001 | 85 | 010000010101 |
| 16 | 010001010001 | 51 | 001010101001 | 86 | 001000010101 |
| 17 | 001001010001 | 52 | 101010101001 | 87 | 101000010101 |
| 18 | 101001010001 | 53 | 100000000101 | 88 | 000100010101 |
| 19 | 000101010001 | 54 | 010000000101 | 89 | 100100010101 |
| 20 | 100101010001 | 55 | 001000000101 | 90 | 010100010101 |
| 21 | 010101010001 | 56 | 101000000101 | 91 | 000010010101 |
| 22 | 100000001001 | 57 | 000100000101 | 92 | 100010010101 |
| 23 | 010000001001 | 58 | 100100000101 | 93 | 010010010101 |
| 24 | 001000001001 | 59 | 010100000101 | 94 | 001010010101 |
| 25 | 101000001001 | 60 | 000010000101 | 95 | 101010010101 |
| 26 | 000100001001 | 61 | 100010000101 | 96 | 100001010101 |
| 27 | 100100001001 | 62 | 010010000101 | 97 | 010001010101 |
| 28 | 010100001001 | 63 | 001010000101 | 98 | 001001010101 |
| 29 | 000010001001 | 64 | 101010000101 | 99 | 101001010101 |
| 30 | 100010001001 | 65 | 100001000101 | 100 | 000101010101 |
| 31 | 010010001001 | 66 | 010001000101 | 101 | 100101010101 |
| 32 | 001010001001 | 67 | 001001000101 | 102 | 010101010101 |
| 33 | 101010001001 | 68 | 101001000101 | | |
| 34 | 100001001001 | 69 | 000101000101 | | |
| 35 | 010001001001 | 70 | 100101000101 | | |

FIG.5

| NUMBER | NORMAL CODE | SPECIFIC CODE | NUMBER | NORMAL CODE | SPECIFIC CODE |
|---|---|---|---|---|---|
| 1 | 100000010001 | 100000000101 | 26 | 010100001001 | 010100100101 |
| 2 | 010000010001 | 010000000101 | 27 | 000010001001 | 000010100101 |
| 3 | 001000010001 | 001000000101 | 28 | 100010001001 | 100010100101 |
| 4 | 101000010001 | 101000000101 | 29 | 010010001001 | 010010100101 |
| 5 | 000100010001 | 000100000101 | 30 | 001010001001 | 001010100101 |
| 6 | 100100010001 | 100100000101 | 31 | 101010001001 | 101010100101 |
| 7 | 010100010001 | 010100000101 | 32 | 100001001001 | 100000010101 |
| 8 | 000010010001 | 000010000101 | 33 | 010001001001 | 010000010101 |
| 9 | 100010010001 | 100010000101 | 34 | 001001001001 | 001000010101 |
| 10 | 010010010001 | 010010000101 | 35 | 101001001001 | 101000010101 |
| 11 | 001010010001 | 001010000101 | 36 | 000101001001 | 000100010101 |
| 12 | 101010010001 | 101010000101 | 37 | 100101001001 | 100100010101 |
| 13 | 100001010001 | 100001000101 | 38 | 010101001001 | 010100010101 |
| 14 | 010001010001 | 010001000101 | 39 | 100000101001 | 100010010101 |
| 15 | 001001010001 | 001001000101 | 40 | 010000101001 | 010010010101 |
| 16 | 101001010001 | 101001000101 | 41 | 001000101001 | 001010010101 |
| 17 | 000101010001 | 000101000101 | 42 | 101000101001 | 101010010101 |
| 18 | 100101010001 | 100101000101 | 43 | 000010101001 | 000010010101 |
| 19 | 010101010001 | 010101000101 | 44 | 100100101001 | 100001010101 |
| 20 | 100000001001 | 100000100101 | 45 | 010100101001 | 010001010101 |
| 21 | 010000001001 | 010000100101 | 46 | 001010101001 | 001001010101 |
| 22 | 001000001001 | 001000100101 | 47 | 100010101001 | 101001010101 |
| 23 | 101000001001 | 101000100101 | 48 | 000100101001 | 000101010101 |
| 24 | 000100001001 | 000100100101 | 49 | 010010101001 | 010101010101 |
| 25 | 100100001001 | 100100100101 | 50 | 101010101001 | 100101010101 |

FIG.6

| NUMBER | ALTERNATIVE CODE | NUMBER | ALTERNATIVE CODE | NUMBER | ALTERNATIVE CODE |
|---|---|---|---|---|---|
| 1 | 000100000000 | 31 | 010101010000 | 111 | 000010010010 |
| 2 | 010100000000 | 32 | 000000001000 | 112 | 010010010010 |
| 3 | 000010000000 | 33 | 010000001000 | 113 | 001010010010 |
| 4 | 010010000000 | 34 | 001000001000 | 114 | 000001010010 |
| 5 | 001010000000 | 35 | 000100001000 | 115 | 010001010010 |
| 6 | 000001000000 | 36 | 010100001000 | 116 | 001001010010 |
| 7 | 010001000000 | 37 | 000010001000 | 117 | 000101010010 |
| 8 | 001001000000 | 38 | 010010001000 | 118 | 010101010010 |
| 9 | 000101000000 | 39 | 001010001000 | 119 | 000000001010 |
| 10 | 010101000000 | 40 | 000001001000 | 120 | 010000001010 |
| 11 | 000000100000 | 41 | 010001001000 | 121 | 001000001010 |
| 12 | 010000100000 | 42 | 001001001000 | 122 | 000100001010 |
| 13 | 001000100000 | 43 | 000101001000 | 123 | 010100001010 |
| 14 | 000100100000 | 44 | 010101001000 | 124 | 000010001010 |
| 15 | 010100100000 | 45 | 000000101000 | 125 | 010010001010 |
| 16 | 000010100000 | 46 | 010000101000 | 126 | 001010001010 |
| 17 | 010010100000 | 47 | 001000101000 | 127 | 000001001010 |
| 18 | 001010100000 | 48 | 000100101000 | 128 | 010001001010 |
| 19 | 000000010000 | 49 | 010100101000 | 129 | 001001001010 |
| 20 | 010000010000 | 50 | 000010101000 | 130 | 000101001010 |
| 21 | 001000010000 | 51 | 010010101000 | 131 | 010101001010 |
| 22 | 000100010000 | 52 | 001010101000 | 132 | 000000101010 |
| 23 | 010100010000 | 53 | 010000000100 | 133 | 010000101010 |
| 24 | 000010010000 | 54 | 001000000100 | 134 | 001000101010 |
| 25 | 010010010000 | 55 | 000100000100 | 135 | 000100101010 |
| 26 | 001010010000 | 56 | 010100000100 | 136 | 010100101010 |
| 27 | 000001010000 | 57 | 000010000100 | 137 | 000010101010 |
| 28 | 010001010000 | 58 | 010010000100 | 138 | 010010101010 |
| 29 | 001001010000 | 59 | 001010000100 | 139 | 001010101010 |
| 30 | 000101010000 | 60 | 000001000100 | | |

FIG. 7

DATA CONVERTING METHOD AND APPARATUS THEREFOR

BACKGROUND OF THE INVENTION

The present invention relates to a data converting method and apparatus therefor suitable for converting digital data into a bit stream to be recorded on a recording medium in an apparatus of recording/ reproducing digital data using a recording medium such as an optical disk.

To record digital data on a recording medium such as an optical disk, a recording bit stream is demanded various characteristics. The recording bit stream is a bit pattern corresponding to a recording pattern on the recording medium. The recording bit stream is recorded as land and groove pits on the reflecting surface of a read-only optical disk, as marks in different magnetized states on a recordable optical disk such as a magneto-optical disk, and as marks having different optical constants on a phase change optical disk.

Digital data (original data) to be recorded must be converted into an optimum recording bit stream by a data conversion process in consideration of the manufacturing process of an optical disk, the optical characteristics of an optical head for reading a recording bit stream by a laser beam, and the characteristics of a signal process system for reconstructing a reproduced signal obtained by reading a recording bit stream from an optical disk into original digital data.

The read-only optical disk on which data is recorded as pits desirably has a large minimum pit length because a small minimum pit length leads to abrupt decrease in a reproduced signal output owing to deterioration of optical characteristics. To the contrary, a large maximum pit length decreases the reverse count of a reproduced signal. As a result, the clock timing reproduction performance deteriorates to increase jitter, and code errors readily occur. Therefore, the maximum pit length is desirably small.

Also, the DC and low-frequency components of a recording bit stream recorded as pits on an optical disk must be small. The DC and low-frequency components may influence tracking servo for accurately tracing a track formed on an optical disk, so they must be suppressed to accurately read a recording data stream.

Further, the width of a detection window must also be large. When original data is recorded by division into many bits, even if the pit length conditions are satisfied, the time phase margin decreases upon detection, and the reproduction clock frequency increases. As the reproduction clock frequency increases, the signal processor circuit must operate at a high speed, resulting in high circuit cost.

An example of data conversion systems considering these conditions is 8/14 conversion disclosed in Jpn. Pat. Appln. KOKAI Publication No. 6-284015 (to be referred to as reference [1]). 8/14 conversion is a data conversion system of converting 8-bit data into a 14-bit code. The code obtained by this conversion is converted into a recording bit stream such as an NRZI (Non Return to Zero-Inverse) pattern, and recorded on a recording medium. In reference [1], a table used for code conversion from 8 bits to 14 bits is optimally switched to decrease the value (DSV (Digital Sum Variation)) obtained by cumulating bits "0" and "1" of the recording bit stream as "−1" and "+1". Thus, 8/14 conversion can satisfactorily suppress the DC and low-frequency components of the recording bit stream.

However, in reference [1], since the number of bits increases to 14/8 the original data after data conversion, the width of the detection window decreases, and the clock frequency increases at the same ratio.

In recent years, a higher data transfer speed is required of digital recording apparatuses such as an optical disk apparatus. A higher data transfer speed increases the clock frequency, which requires a high-cost signal processor circuit capable of operating at a high speed.

Jpn. Pat. Appln. KOKAI Publication No. 56-149152 (to be referred to as reference [2]) discloses another data conversion system. The data conversion system disclosed in reference [2] converts original data into a code 1.5 times in the number of bits. Since the obtained code has a run of 1 to 7 bits "0" between bits "1", this data conversion system is generally called (1,7) RLL (Run Length Limited) coding. The data conversion system can be realized by a relatively low clock frequency and small-size circuit. However, this system does not manage DSV, unlike 8/14 conversion described in reference [1], so the DC and low-frequency components of the recording bit stream are not suppressed. In the system of reference [2], the tracking performance may deteriorate.

To suppress the DC and low-frequency components of a recording bit stream, an adjustment bit for decreasing DSV is inserted in the bit stream separately from data bits to be recorded. Inserting the adjustment bit decreases the effective capacity of the recording medium. The code obtained by reference [2] is of a variable length coding type in which conversion from 2 bits into 3 bits and conversion from 4 bits into 6 bits exist. For this reason, bit errors readily propagate.

As described above, in the conventional data conversion system, if the DC and low-frequency components of a recording bit steam are suppressed to stabilize tracking servo, the clock frequency increases undesirably for the signal processor circuit. If the clock frequency is suppressed low, the DC and low-frequency components of the recording bit steam cannot be suppressed. If the adjustment bit is inserted, the effective recording capacity of the recording medium decreases.

BRIEF SUMMARY OF THE INVENTION

It is an object of the present invention to provide a data converting method and apparatus therefor capable of converting input data into an output bit stream of codes with a different number of bits from that of the input data while suppressing the DC and low-frequency components of the output bit stream without increasing the clock frequency so high and inserting any redundant adjustment bit in the output bit stream.

The present invention provides A data converting method comprising the steps of converting m-bit input data into an n-bit converted code using a first table having a conversion code group in which the number of consecutive bits "0" between bits "1" of the conversion code is limited to not less than d and not more than k, the number of consecutive bits "0" on a start side of the conversion code is limited to not more than k1, and the number of consecutive bits "0" on an end side of the conversion code is limited to not more than k2; adaptively inverting a last bit of the converted code obtained in the step of converting m-bit input data; converting the converted code, which is obtained in the step of converting m-bit input data and the step of inverting a last bit, into an NRZI pattern in which an output is inverted for a bit "1" of the code and held for a bit "0" thereof; cumulating bits "0" and "1" of the NRZI pattern as "−1" and "+1", respectively, thereby obtaining a cumulated value; and performing one of following steps (a), (b) and (c) for a current code in which the number of consecutive bits "0" on the end side of the converted code is larger than (k−k1) among converted codes obtained in the step of converting m-bit input data, (a) executing the step of inverting a last bit, when a sum of the number of consecutive bits "0" on the end side of the current code and the number of consecutive bits "0" on the start side of a next code following the current code exceeds k, (b) inhibiting execution of the step of inverting a last bit, when the number of consecutive bits "0" on the start side of the next code is smaller than d, and (c) determining, as invertible positions, at least some last bits of the converted code obtained in the step of converting m-bit input data, and controlling execution/nonexecution of the step of inverting a last bit at each invertible position so as to decrease an absolute value of the cumulated value at a next invertible position, when neither condition in the step (a) nor condition in the step (b) are satisfied.

In the present invention, m-bit input data is converted into an n-bit code using the first table having a code group in which the number of consecutive bits "0" between bits "1" is limited between d and k, the number of consecutive bits "0" on the start side is limited to k1 or less, and the number of consecutive bits "0" on the end side is limited to k2 or less. The last bit of the code obtained by code conversion is adaptively inverted. The code conversion process and bit inverse process can provide codes in which the number of consecutive bits "0" is limited between d and k not only within each code but also at the boundary between concatenated codes.

The code obtained by the code conversion process and bit inverse process is converted into an NRZI pattern in which an output is inverted for a bit "1" of the code and held for a bit "0" thereof. The NRZI pattern is output as an output bit stream. Bits "0" and "1" of the NRZI pattern are respectively cumulated as "−1" and "+1" to obtain a cumulated value (DSV).

The bit inverse process is controlled to limit the number of consecutive bits "0" at the code boundary to d or more and k or less, and to decrease the absolute value of DSV.

Under the bit inverse control, the following process is done for the current code in which the number of consecutive bits "0" on the end side is larger than (k−k1) among codes obtained by code conversion. That is, (a) when the sum of the number of consecutive bits "0" on the end side of the current code and the number of consecutive bits "0" on the start side of the next code exceeds k, bit inverse is executed. (b) When the number of consecutive bits "0" on the start side of the next code is smaller than d, execution of bit inverse is inhibited. (c) When neither the condition (a) nor condition (b) are satisfied, at least some last bits of the code obtained by code conversion are determined as invertible positions, and execution/nonexecution of bit inverse at each invertible position is controlled to decrease the absolute value of DSV up to the next invertible position.

In this data conversion according to the present invention, for example, m, n, d, k, k1, and k2 are respectively set to 8, 12, 1, 8, 4, and 8. The DC and low-frequency components of the output bit stream can be suppressed by decreasing the absolute value of DSV without increasing the clock frequency so high and inserting any redundant adjustment bit in the output bit stream.

According to the present invention, in code conversion, when the sum of the number of consecutive bits "0" on the end side of the current code and the number of consecutive bits "0" on the start side of the next code among codes converted using the first table is smaller than d, input data is converted into a current code using the second table having a code group which satisfies the same conditions as the code group of the first table, is not included in the code group of the first table, and has the same number of consecutive bits "0" on the start side as that of a code converted using the first table. Further, input data is converted into a next code using the third table having a code group in which the number of consecutive bits "0" between bits "1" is limited between d and k, the number of consecutive bits "0" on the start side is limited between d and (k−d+1), and the number of consecutive bits "0" on the end side is limited between d and k2.

Even under conditions of, e.g., m=8, n=12, d=1, and k=8, this process can provide, for all the patterns of input data, codes in which the number of consecutive bits "0" is limited between d and k not only within each code but also at the boundary between concatenated codes.

In code conversion also using the second table, the following process may be done for a code in which the number of consecutive bits "0" on the end side of a code converted using the third table is larger than d. (d) When the sum of the number of consecutive bits "0" on the end side and the number of consecutive bits "0" on the start end of the next code converted using the first table exceeds k, bit inverse is executed. (e) When the number of consecutive bits "0" on the start side of the next code is smaller than d, execution of bit inverse is inhibited. (f) When neither the condition (d) nor condition (e) are satisfied, at least some last bits of the code obtained by code conversion are newly determined as invertible positions, and execution/nonexecution of bit inverse at each invertible position is controlled to decrease the absolute value of DSV up to the next invertible position.

By setting a larger number of invertible positions and using them to manage DSV, the DC and low-frequency components of the output bit stream can be more effectively suppressed.

In code conversion, the method may further comprise the step of periodically inserting a sync code in the bit stream, and execution/nonexecution of bit inverse at the invertible position may be controlled to decrease the absolute value of DSV from the invertible position up to a sync-code-inserted position. The method may further comprise the sync code pattern selection step of selecting either one of a pattern having an even number of bits "1" and a pattern having an odd number of bits "1" in the sync code so as to decrease the absolute value of DSV up to an invertible position immediately after the sync-code-inserted position. These steps can more effectively suppress the DC and low-frequency components of the output signal stream.

A data converting apparatus according to the present invention comprises a code converter section which converts m-bit input data into an n-bit code using a table having a code group in which the number of consecutive bits "0" between bits "1", the number of consecutive bits "0" on the start side, and the number of consecutive bits "0" on the end side are respectively limited, a bit inverter section which properly inverts the last bit of a code obtained by the code converter section, a NRZI converter section which converts the code obtained by the code converter section and bit inverter section into an NRZI pattern in which an output is inverted for a bit "1" of the code and held for a bit "0" thereof, a cumulation section which cumulates bits "0" and "1" of the NRZI pattern as "−1" and "+1", respectively, thereby obtaining a cumulated value (DSV), and a controller section which determines at least some last bits of the code obtained by the code converter section as invertible positions where the bit is arbitrarily inverted or not inverted, and controlling execution/nonexecution of inverse at each invertible position by the bit inverter section so as to decrease the absolute value of DSV up to the next invertible position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a table showing examples of a 12-bit pattern which satisfy (1,8) RLL coding conditions used in a data converting method according to an embodiment of the present invention;

FIG. 3 is a table showing examples of a bit pattern (first table) which can be assigned to main codes A used in the data converting method according to the embodiment;

FIG. 4 is a table showing some of the main codes A and their inverted codes used in the data converting method according to the embodiment;

FIG. 5 is a table showing examples of a bit pattern (second table) which can be assigned to main codes B used in the data converting method according to the embodiment;

FIG. 6 is a table showing the correspondence between the normal and specific codes of the main codes B used in the data converting method according to the embodiment;

FIG. 7 is a table showing examples of a bit pattern (third table) which can be assigned to alternate codes used in the data converting method according to the embodiment;

DETAILED DESCRIPTION OF THE INVENTION

There will now be described a basic concept of the present invention referring to FIGS. 1A and 1B.

Figure 1:
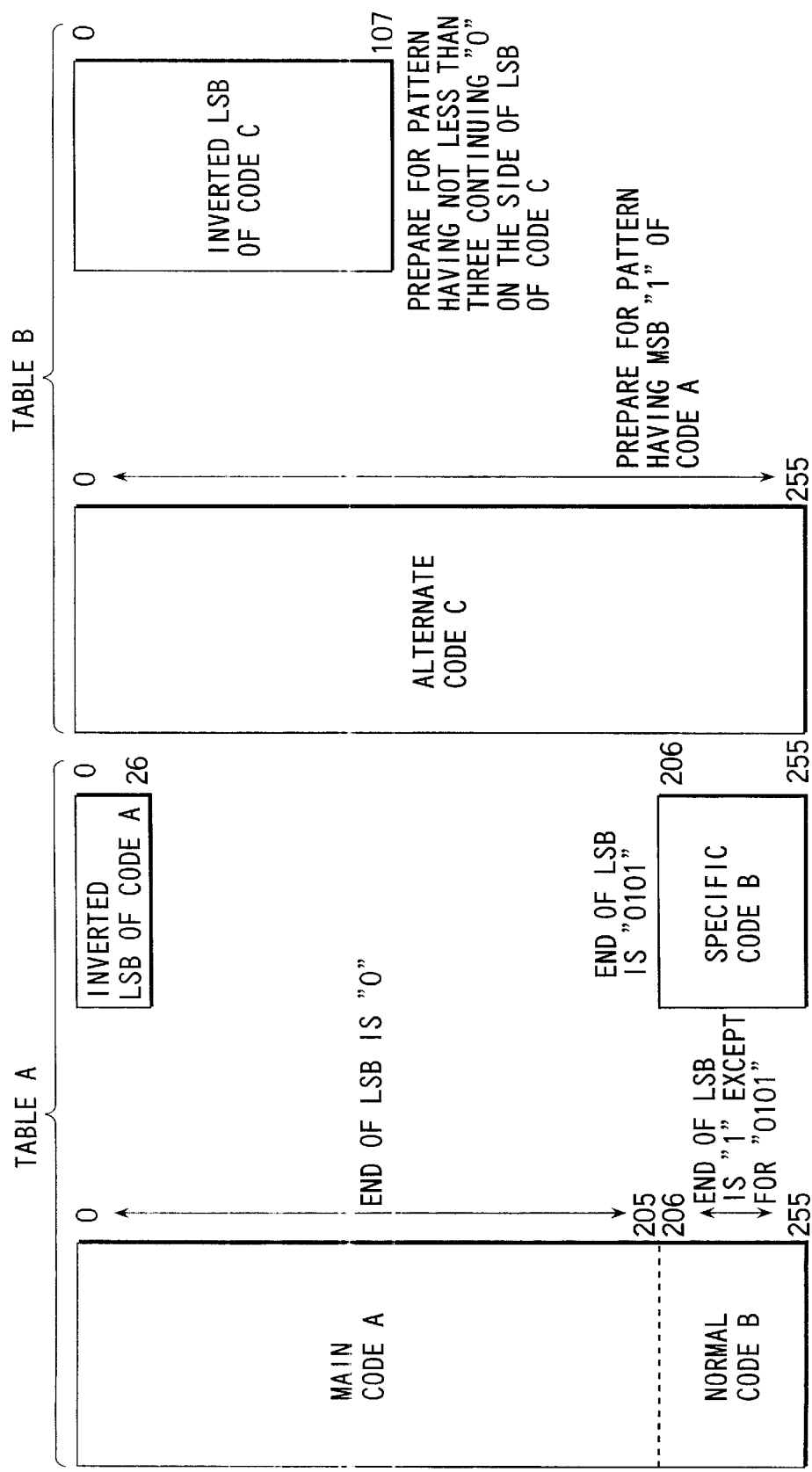
FIGS. 1A and 1B are 8/12 conversion tables.

FIG. 1A shows a main code table for converting 8-bit data into 12-bit data, and FIG. 1B shows a substitute table. FIG. 1A shows 256 8-bit codes to be converted into 12-bit codes. A table A has main codes A constructed by 206 patterns from a code 0 to a code 206. Main codes B have 102 patterns. The main codes B consisted of 102 patterns are divided into 50 patterns of normal codes 206 to 255 and 50 patterns of specific codes 206 to 255 which are paired with the normal codes. The remaining two patterns are not used.

The alternate codes C in the alternate code table shown in FIG. 1B are used as a code following a specific code, when the specific code is used as a current code.

The normal code and specific code of the main codes B are switched in accordance with whether the header of the next code is "0" or "1". In other words, whether the next code starts from "0" or "1" can be known by checking whether the main code B is a normal code or a specific code. If the code starting from "1" offends against the predetermined restrictions, the alternate code is used as the next code.

Codes starting from "1" exist discretely in the main codes as shown in FIG. 4, so that the alternate codes C are sparsely made. When the alternate codes are made, the number of the head bits "0" and the number of the rear bits "0" are restricted. However, the range in which the number of bits "0" is restricted is broader than that of the main codes A. In other words, when an alternate code is selected, the last bit of the code immediately before the selected alternate code is always "1", so that the number of bits "0" on the header side may be large. However, in a case of the main code, the code immediately before the selected code may include consecutive "0"s. Thus, the number of "0"s is restricted so that the number of consecutive "0"s is not extremely increased.

A data converting method according to the present invention will be described in detail below by exemplifying an embodiment in which input data is converted into a bit stream (output bit stream) suitable for recording on a recording medium such as an optical disk. This embodiment includes an 8/12 conversion process in which digital data (input data) of m=8 bits is converted into a code of n=12 bits.

Input data has 256 bit patterns each expressed by 8 bits. To the contrary, an 8/12-converted code has 4,096 bit patterns each expressed by 12 bits. The principal data conversion process is assignment between the 256 patterns and 4,096 patterns.

Figure 8:
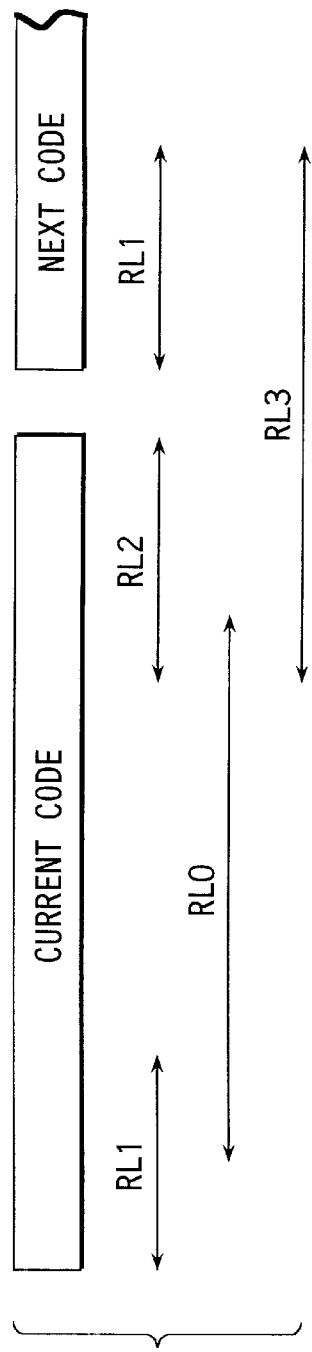
FIG. 8 is a view for explaining the number of consecutive bits "0" between bits "1" of a code, the number of consecutive bits "0" on the start side of the code, the number of consecutive bits "0" on the end side of the code, and the number of consecutive bits "0" at the code boundary according to the embodiment.

Major conditions for this conversion are (1) large minimum bit length (2) small maximum bit length (3) large width of the detection window (4) low reproduction clock frequency (5) small DC and low-frequency components of the output bit stream To satisfy conditions (1) and (2), this embodiment adopts (1,8) RLL coding in which a run length RL0 (see FIG. 8) of bits "0" (more accurately, the number of consecutive bits "0" between bits "1") is limited to d=1 or more and k=8 or less. In this case, (1,8) RLL coding conditions must be satisfied even at the code boundary when codes are concatenated. For this purpose, the embodiment uses a bit inverse process (to be described later).

To satisfy conditions (3) and (4), this embodiment adopts 8/12 conversion, as described above. 8/12 conversion suppresses the reproduction clock frequency to 12/8=1.5 times the reference clock frequency of input data, which is lower than in 8/14 conversion described in reference [1].

To satisfy condition (5), this embodiment manages DSV by controlling execution/nonexecution of bit inverse at a bit position (invertible position) where bit inverse is arbitrarily executed or not executed.

The (1,8) RLL coding will be explained. FIG. 2 shows examples of the 12-bit pattern which satisfy (1,8) RLL coding conditions. The number of 12-bit patterns which satisfy (1,8) RLL coding conditions is 365, which exceeds the 256 patterns of 8-bit input data. Thus, 8-bit input data can be sufficiently converted into a 12-bit code which satisfies (1,8) RLL coding conditions. However, if these 12-bit codes are successively concatenated, (1,8) RLL coding conditions may not be satisfied at the code boundary.

This embodiment, therefore, performs data conversion for satisfying (1,8) RLL coding conditions even at the boundary between codes converted as follows. This data conversion process is mainly divided into (i) code conversion process, (ii) bit inverse process, (III) NRZI conversion, and (iv) bit inverse control. These processes will be sequentially explained.

When two arbitrary codes made of bit patterns in FIG. 2 are concatenated, bits "1" may successively occur, or a maximum of 16 bits "0" may successively occur at the code boundary. To avoid this, the bit pattern in FIG. 2 is constrained at two code ends as follows. A run length RL1 (see FIG. 8) of bits "0" on the start side of the code is set to k1=4 or less, and a run length RL2 (see FIG. 8) of bits "0" on the end side is set to d=1 or more and k2=8 or less. These codes are assigned as main codes A. This constraint decreases the number of codes to 207.

FIG. 3 shows bit patterns which can be assigned to the main codes A. FIG. 3 shows the contents of the first table. A code group including the main codes A having these bit patterns are described in correspondence with various bit patterns of input data. The code conversion process converts 8-bit input data into a 12-bit code basically using the first table, and also using the second and third tables (to be described later).

If data conversion is done using only the first table having a code group including the main codes A, a run length RL3 (see FIG. 8) of bits "0" (the sum of the number of consecutive bits "0" on the end side of the current code and the number of consecutive bits "0" the start side of the next code) may exceed k=8 at the code boundary. Under the constraint on the pattern at two code ends, the run length RL3 of bits "0" at the code boundary exceeds k=8 in the following 10 combinations (RL2:RL1) of the run length RL2 of bits "0" on the end side of the current code and the run length RL1 of bits "0" on the start side of the next code.

For RL3=9, (8:1), (7:2), (6:3), (5:4)

For RL3=10, (8:2), (7:3), (6:4)

For RL3=11, (8:3), (7:4)

For RL3=12, (8:4) As is apparent from this, when the run length RL2 of bits "0" on the end side of the current code is larger than (k−k1)=4 (not less than 5), and the run length RL1 of bits "0" on the start side of the next code is d=1 or more, the run length RL3 of bits "0" at the boundary between the current and next codes may exceed 8.

To prevent this, a pattern having the last bit of the code inverted to "1" is assigned as an "inverted code" to 27 pattern codes in which the run length RL2 of bits "0" on the end side exceeds (k−k1)=4, as shown in FIG. 4. By properly selecting execution/ nonexecution of bit inverse in accordance with the run length RL3 of bits "0" at the code boundary, (1,8) RLL coding conditions can be always satisfied. Since the final bits of the 207 patterns belonging to the main codes A shown in FIG. 3 are always "0", inverted codes after the bit inverse process do not overlap the main codes A.

The first table having a code group including the main codes A can only cope with input data of 207 patterns at maximum. To assign codes to all input data of the 256 8-bit patterns, other patterns must be assigned as codes for input data of the remaining 49 patterns.

This embodiment newly adds patterns each having a last bit of "1" as codes for input data of the 49 patterns. There are 129 patterns in which (1,8) RLL coding conditions are satisfied, the run length RL1 of bits "0" on the start side is k1=4 or less, and the last bit is "1". Of these patterns which satisfy the above conditions, only 102 patterns can be actually used except for the 27 patterns used as the inverted codes in FIG. 4. Codes having these pattern codes are assigned as main codes B.

FIG. 5 shows bit patterns which can be assigned to the main codes B. FIG. 5 shows the contents of the second table. A code group including the main codes B having these bit patterns are described in correspondence with various bit patterns of input data.

If a main code B having a last bit of "1" is assigned, bits "1" may successively occur at the code boundary, failing to satisfy (1,8) RLL coding conditions. To avoid this, either one of two codes (specific and normal codes) is selected from the main codes B in accordance with whether the first bit of the next code is "0" or "1", and the selected code is assigned to the current code. At the same time, an "alternate code" obtained from the third table (to be described below) is assigned to the next code.

For example, the main codes B are classified into "specific codes" in which the last 3 bits have a specific pattern such as "101", and other "normal codes", and the specific and normal codes are combined. When the next code starts with a bit "1", a specific code is used; when the next code starts with "0", a normal code is used.

Each combination of specific and normal codes for one data is preferably assigned such that the two codes have the same number of consecutive bits "0" on the start side in order to facilitate determination of execution/nonexecution of the above bit inverse process. As a result, the main codes B allow assigning codes to data of 50 patterns. FIG. 6 shows combinations of specific and normal codes selected from the main codes B.

Since the 207 main codes A and the 50 main codes B can be added to prepare 257 codes, codes can be satisfactorily assigned to input data of the 256 8-bit patterns.

The alternate codes used when bits "1" successively occur at the code boundary will be explained.

Only when the last 3 bits of the current code have the specific code "101", an alternate code is used as a next code following the specific code. Hence, the alternate codes can adopt patterns which overlap codes used as the main codes A and B.

The alternate codes must satisfy conditions that the run length RL1 of bits "0" on the start side is d=1 or more and (k−d+1)=8 or less, the run length RL2 of bits "0" on the end side is d=1 or more and k2=8 or less, and (1,8) RLL coding conditions (the run length RL0 of bits "0" between bits "1" is d=1 or more and k=8 or less) are satisfied. There are 139 patterns which satisfy these conditions.

FIG. 7 shows examples of the bit pattern which can be assigned to the alternate codes. FIG. 7 shows the contents of the third table. A code group including alternate codes having these bit patterns are described in correspondence with specific bit patterns of input data. Input data requiring assignment of alternate codes are limited to patterns corresponding to codes starting with a bit "1" among the group of codes used as the main codes A described on the first table in FIG. 3 and the group of codes used as the main codes B described on the second table in FIG. 5. In FIGS. 3 and 5, there are 107 codes starting with a bit "1", which are smaller in number than patterns used for the alternate codes. Therefore, the alternate codes can be sufficiently assigned.

As for the alternate codes as well as the main codes A, the run length RL3 of bits "0" at the boundary with the next code may exceed k=8 for a code in which the run length RL2 of bits "0" on the end side exceeds (k−k1)=4. In this case, the last bit of the alternate code is inverted to "1". The inverted code can be assigned to an alternate code in which the run length RL2 of bits "0" on the end side is 2 or more.

Note that a code having a pattern with a last bit of "1" is not included in the alternate code before inverse, so the bit inverse process does not make codes overlap each other. The run length RL2 of bits "0" on the end side of the alternate code is limited to k=8 or less. When the run length RL3 of bits "0" at the code boundary exceeds 8, the next code always starts with a bit "0". Thus, the bit inverse process does not result in a run of bits "1".

A code obtained by the above-described code conversion process and bit inverse process further undergoes NRZI (Non Return to Zero-Inverse) conversion into a final output bit stream. The NRZI conversion converts an input code into a binary pattern (NRZI pattern) in which an output is inverted for a bit "1" of the code and held for a bit "0", thereof.

A method of suppressing the DC and low-frequency components of an output bit stream in this embodiment will be described. To suppress the DC and low-frequency components, bits "0" and "1" of an NRZI pattern are respectively cumulated as "−1" and "+1" to obtain a cumulated value (DSV), and the absolute value of DSV is controlled smaller. DSV corresponds to a charge accumulation amount in electrical signal expression, and represents the DC level of the signal.

In view of the presence of bits (invertible positions) which may or may not be inverted, other than bits which must always be inverted in the above bit inverse process, the embodiment controls execution/nonexecution of bit inverse at least some of current invertible positions so that the absolute value of DSV at the next invertible position is further decreased.

This bit inverse control will be explained.

Note that the bit inverse control may use not all but some of the invertible positions as bit invertible positions, and may calculate the absolute value of DSV at a relatively long data interval.

As described above, the data converting method using 8/12 conversion of this embodiment executes the bit inverse process so as to prevent the run length RL3 of bits "0" at the code boundary from exceeding k=8 for the main codes A and some alternate codes. In the bit inverse process, the constraint (k=8 or less for RL3) on the run length RL3 of bits "0" at the code boundary can be satisfied in two code concatenated states before and after bit inverse. This corresponds to the following 18 combinations (RL2:RL1) of the run length RL2 of bits "0" on the end side of the current code and the run length RL1 of bits "0" on the start side of the next code.

For RL3=3, (2:1)
For RL3=4, (2:2), (3:1)
For RL3=5, (2:3), (3:2), (4:1)
For RL3=6, (2:4), (3:3), (4:2), (5:1)
For RL3=7, (3:4), (4:3), (5:2), (6:1)
For RL3=8, (4:4), (5:3), (6:2), (7:1)

When an inverted code is prepared for a given code, and the combination (RL2:RL1) at the code boundary is any one of the 18 combinations, execution/nonexecution of the bit inverse process can be controlled for another purpose, i.e., management of DSV, other than limiting the number of consecutive bits "0". when the combination (RL2:RL1) is (2:1) for RL3=3, (2:2) for RL3=4, (2:3) for RL3=5, or (2:4) for RL3=6, the bit inverse process converts the last 3 bits of an alternate code into the same bits "101" as a specific code. If, for example, the last 3 bits of the specific code coincide with those of a normal code due to a bit error, the alternate code is regarded as a specific code. A code subsequent to the alternate code is erroneously recognized as an alternate code, resulting in a data conversion error.

To avoid this, this embodiment inhibits the bit inverse process for the last bits of an alternate code when the combination (RL2:RL1) of the run length RL2 of bits "0" on the end side of the current code and the run length RL1 of bits "0" on the start side of the next code is (2:1), (2:2), (2:3), or (2:4). If this error protection need not be particularly considered, the bit inverse process may be done for the last bits of the alternate code even when (RL2:RL1) is (2:1), (2:2), (2:3), or (2:4).

When only one bit of a code obtained by the code conversion process is inverted from a bit "0" to "1" under the bit inverse control, an NRZI-converted signal (output bit stream) is inverted in signal polarity after the inverted bit.

Figure 9:
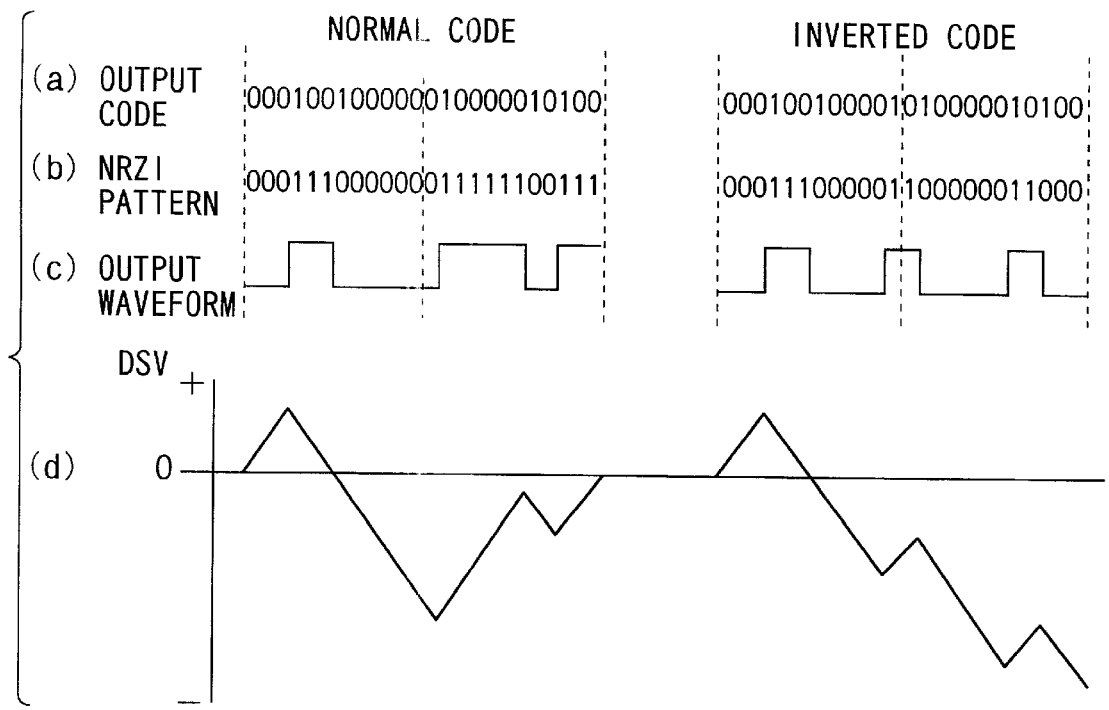
FIG. 9 is a view showing output codes corresponding to normal and inverted codes, an NRZI pattern, an output waveform, and DSV in the data converting method according to the embodiment.

FIG. 9 shows output codes corresponding to normal and inverted codes, an NRZI pattern, an output waveform, and a change in DSV. As is apparent from FIG. 9, bit inverse reverses the change direction of the subsequent DSV. In the example of FIG. 9, nonexecution of bit inverse can decrease the absolute value of DSV.

Hence, DSVs for execution and nonexecution of bit inverse are calculated, and execution/nonexecution of bit inverse is controlled to decrease the absolute value of DSV at a next bit invertible position. By controlling the bit inverse process in this manner, the DC and low-frequency components of the output signal stream can be effectively suppressed.

Figure 10:
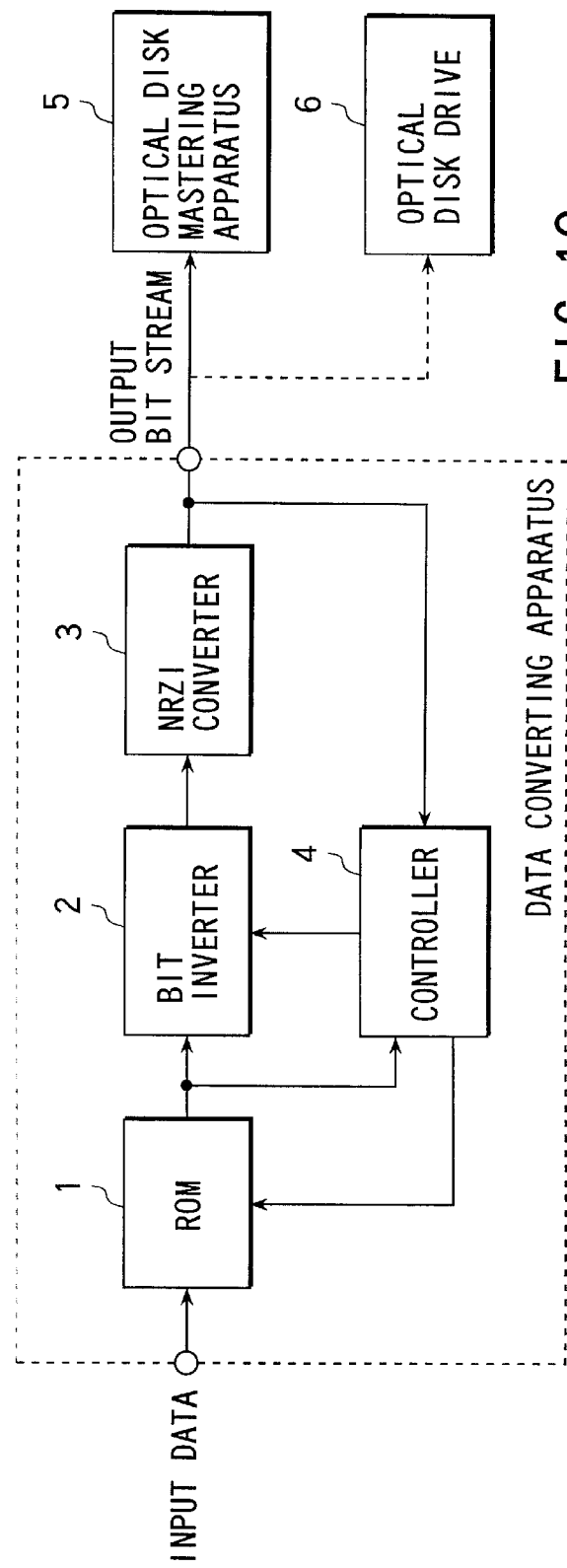
FIG. 10 is a block diagram showing the arrangement of an example of a system to which the data converting method of the present invention is applied.

FIG. 10 shows an example of application of the data converting method to a system for generating a recording bit stream to be supplied to an optical disk mastering apparatus or optical disk drive. The recording bit stream generating system comprises a data converting apparatus made up of a ROM 1, bit inverter 2, NRZI converter 3, and controller 4.

The ROM 1 stores the first, second, and third tables. Input data to the data converting apparatus is supplied as address data to the ROM 1, from which a code is read out under the control of the controller 4. The code read out from the ROM 1 is input to the bit inverter 2 where the last bit is adaptively inverted under the control of the controller 4. The code processed by the bit inverter 2 is converted into an NRZI pattern by the NRZI converter 3, and output as an output bit stream from the data converting apparatus.

The output bit stream is input as a recording bit stream to an optical disk mastering apparatus 5 or optical disk drive 6.

The optical disk mastering apparatus 5 records data as pits on a master disk for manufacturing optical disks. The optical disk mastering apparatus 5 performs the power modulation of an exposure beam in accordance with the recording bit stream, and exposes a photoresist layer formed on the master disk. The optical disk mastering apparatus 5 develops the exposed photoresist layer to form a pit stream corresponding to the recording bit stream on the master disk. The series of steps are mastering. The optical disk mastering apparatus 5 fabricates a stamper by an electroforming using the master disk, and mass-produces read-only optical disks (replica disks) by injection molding using the stamper.

The optical disk drive 6 records/reproduces data by driving a readable/writable recording medium such as a phase change optical medium or magneto-optical medium. The optical disk drive 6 drives a semiconductor laser in accordance with the recording bit stream to record data on the optical disk by the semiconductor laser beam. The optical disk drive 6 reproduces the recorded data by irradiating the optical disk with the semiconductor laser beam and detecting the reflected beam by a photodetector.

Figure 11:
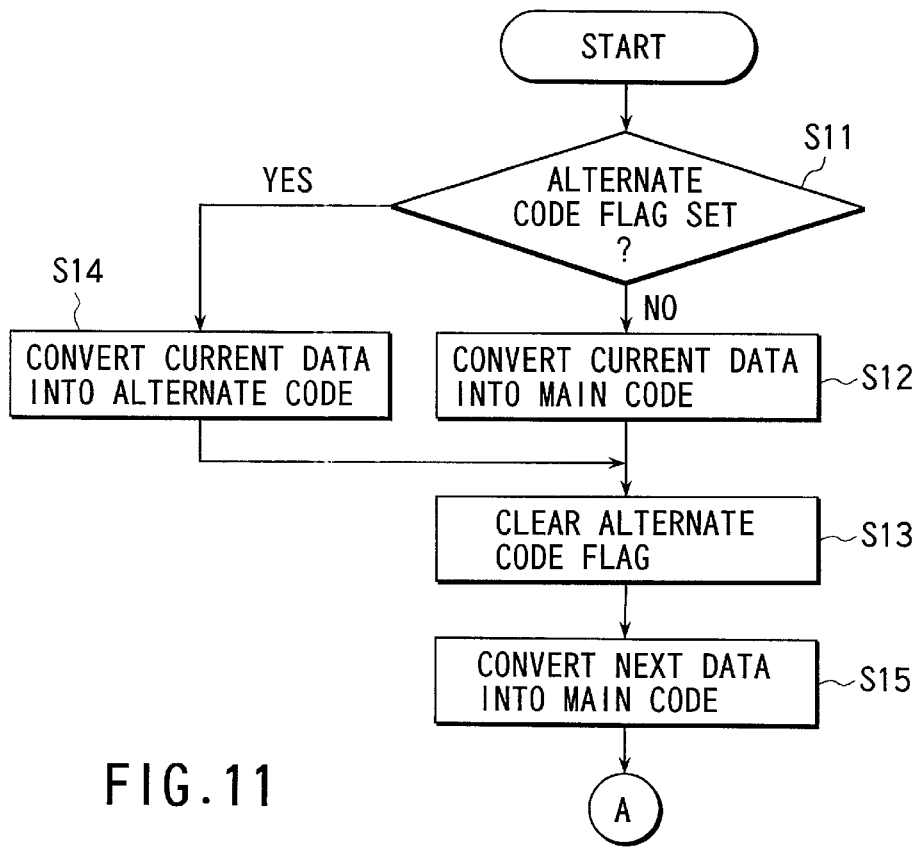
FIG. 11 is a flow chart showing part of the process procedure of the data converting method according to the embodiment.
Figure 12:
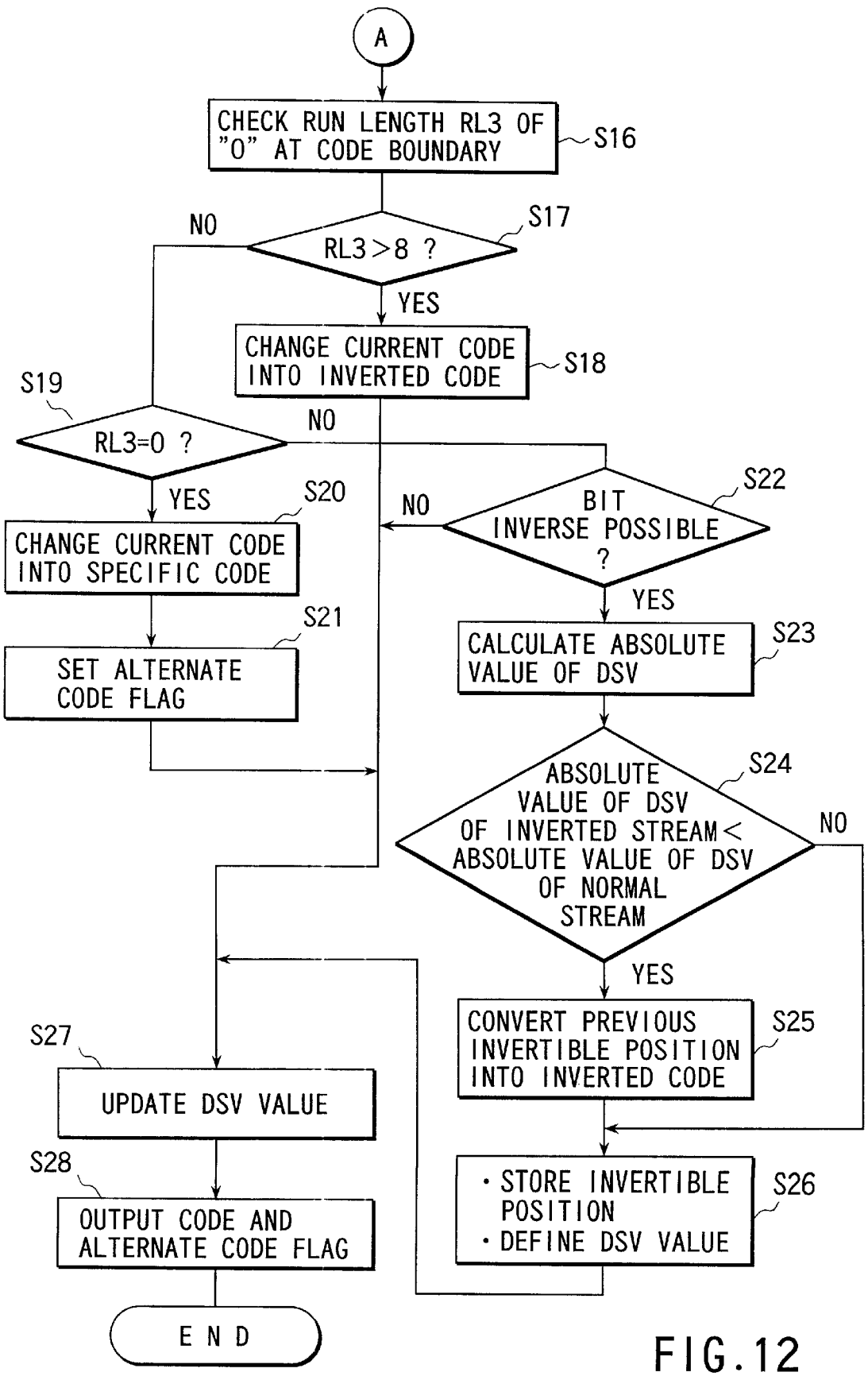
FIG. 12 is a flow chart showing the remaining part of the process procedure of the data converting method according to the embodiment.

A data conversion process procedure in this embodiment will be described with reference to the flow charts in FIGS. 10 and 11.

Whether an alternate code flag is set is checked (step S11). The alternate code flag represents whether to perform code conversion using an alternate code described on the third table. If NO in step S11, the current input data is converted into a normal code of a main code A or B using the first or second table (step S12), and the alternate code flag is cleared (step S13). If YES in step S11, the current input data is converted into an alternate code (step S14), and the alternate code flag is cleared (step S13). The next input data is converted into a normal code of a main code A or B using the first or second table (step S15).

The run length RL3 of bits "0" at the code boundary is detected for the two successive codes (current and next codes) obtained by the code conversion process (step S16). The run length RL3 is checked (steps S17 and S19). If the run length RL3 of bits "0" at the code boundary is determined to exceed k=8 in step S17, the last bit is inverted to a bit "1" to change the current code into an inverted code (step S18). If the run length RL3 of bits "0" at the code boundary is determined to be 0 in step S19, i.e., bits successively occur at the code boundary, the current code is changed into a specific code of a main code B (step S20), and at the same time an alternate code flag is set (step S21).

If neither code boundary conditions are met, i.e., the run length RL3 of bits "0" at the code boundary does not exceed k=8 and is not 0, whether bit inverse is possible is checked (step S22). More specifically, in step S22, if an inverted code having an inverted last bit of "1" exists, and the run length RL1 of bits "0" on the start side of the next code is d=1 or more, bit inverse is possible; otherwise, bit inverse is impossible.

If YES in step S22, the absolute value of DSV is calculated (step S23). The absolute value of DSV of an inverted stream upon bit inverse at the precious invertible position is compared with the absolute value of DSV of a normal stream without executing bit inverse (step S24). If the absolute value of DSV of the inverted stream is smaller than the absolute value of DSV of the normal stream, bit inverse is done at the precious invertible position (step S25). Then, the flow shifts to step S26. If the absolute value of DSV of the inverted stream is larger than the absolute value of DSV of the normal stream in step S24, the flow shifts to step S26 without performing bit inverse.

In step S26, the invertible position is stored, and the DSV value is determined. After that, the DSV value is updated (step S27). In this update, DSV of an inverted stream upon bit inverse at the current invertible position, and DSV of a normal stream without executing bit inverse are calculated. If no bit inverse is executed, DSVs of the two streams are updated.

The obtained code and the alternate code flag set in step S21 are output (step S28). The number of consecutive bits "0" is limited to one at minimum or eight at maximum, which realizes code conversion by 8/12 conversion while suppressing the DC and low-frequency components of the output bit stream. The converted code undergoes the NRZI conversion process of inverting an output for a bit "1" and holding the output for a bit "0". The NRZI-converted code is output as an output signal stream (recording signal stream).

Figure 13:
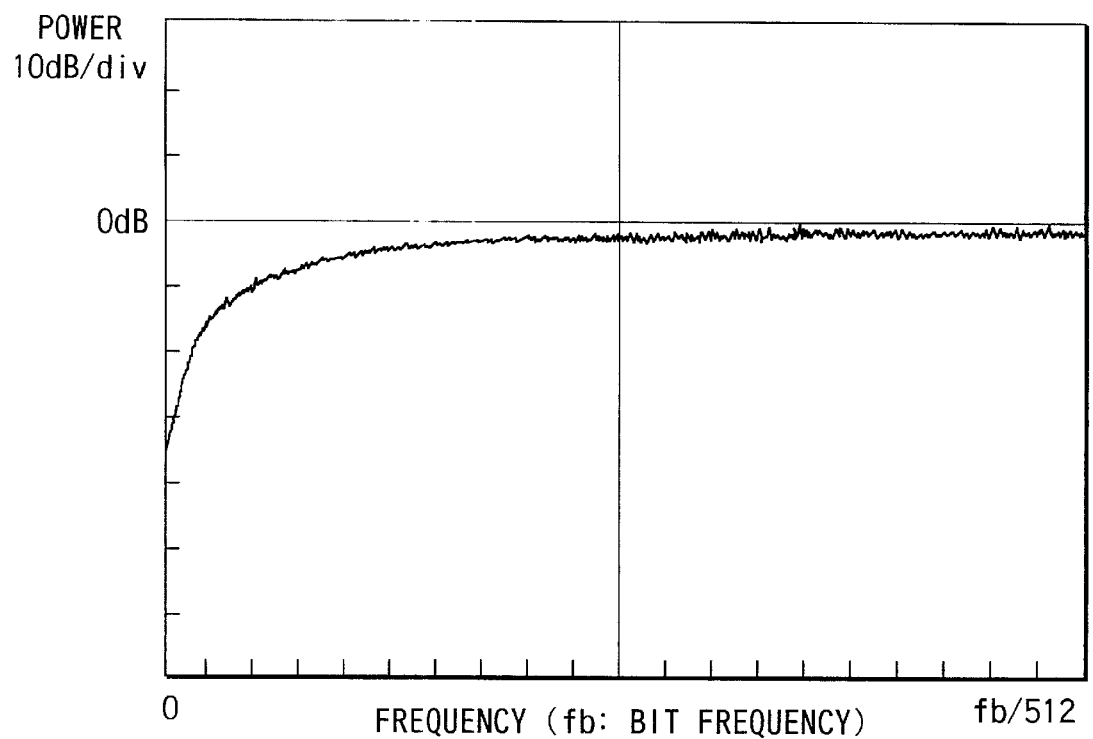
FIG. 13 is a graph showing the power spectrum of an output bit stream obtained by the data converting method according to the embodiment.
Figure 14:
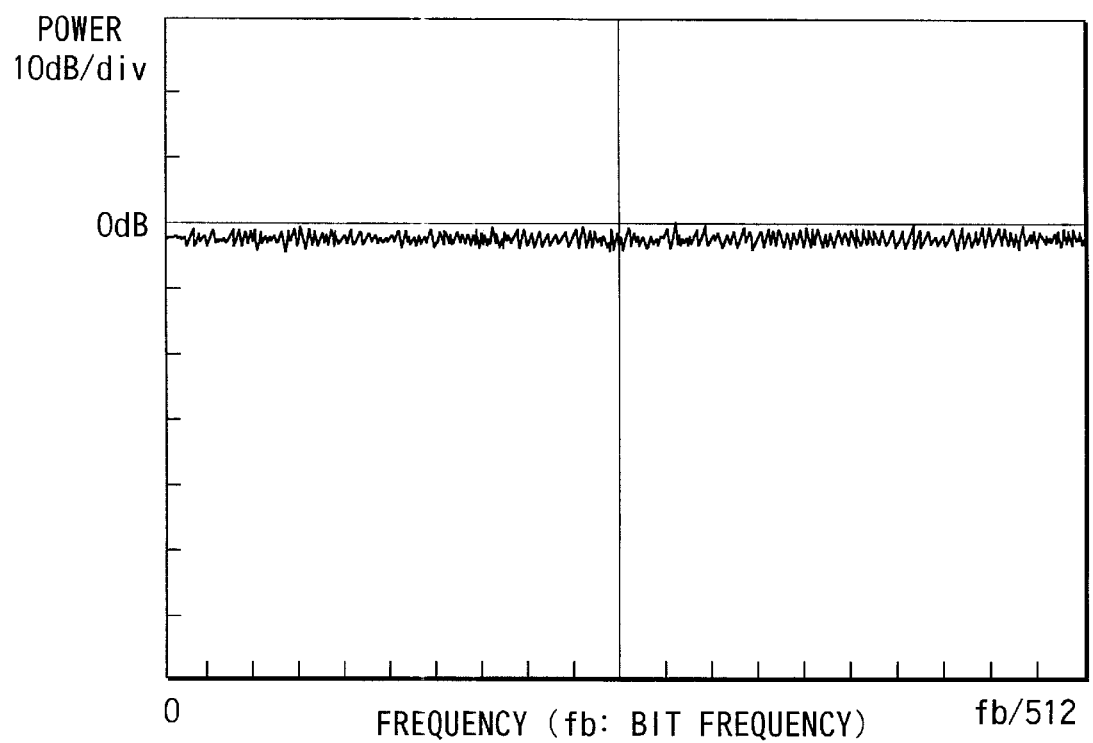
FIG. 14 is a graph showing the power spectrum of an output bit stream obtained by a data converting method using (1,7) RLL coding.

FIG. 13 shows the power spectrum of the output signal stream when the data converting method of the present invention is applied to input data of a random data stream. For comparison, FIG. 14 shows the power spectrum when the conventional (1,7) RLL system is applied to the same data. Since the (1,7) RLL system does not particularly manage the DC and low-frequency components, the spectrum in the low-frequency range exhibits flat characteristics. To the contrary, since the system of this embodiment manages DSV so as to reduce the DC and low-frequency components, the spectrum is greatly suppressed in the range of the DC to low frequency.

Note that the present invention is not limited to the above embodiment. For example, in code conversion, a sync code having a pattern with an even or odd number of bits "1" may be periodically inserted. In this case, the sync-code-inserted position is processed as a bit invertible position. Whether to invert a bit at the precious invertible position may be determined to minimize the absolute value of DSV up to the sync code. Instead, the pattern (even or odd number of bits "1") of the sync code may be selected to minimize the absolute value of DSV up to an invertible position after the sync-code-inserted position.

In this fashion, the sync-code-inserted position is processed as an invertible position, and bit inverse at the invertible position and sync pattern selection are done, thereby controlling DSV. Accordingly, the DC and low-frequency components of the output signal stream can be more effectively suppressed.

As has been described above, according to the present invention, when m-bit data is to be converted into an n-bit code, if the number of consecutive bits "0" at the code boundary is larger than a predetermined value, the last bit of the code is inverted; if the number of consecutive bits "0" falls within a predetermined range regardless of execution/nonexecution of bit inverse, the execution/nonexecution of bit inverse is controlled to decrease the absolute value of DSV of a code-converted NRZI pattern. While the number of consecutive bits "0" is limited to the predetermined range, the DC and low-frequency components of the output bit stream can be suppressed. When the present invention is applied to generate a recording bit stream on the recording medium, the tracking servo and the like of a data recording/reproduction apparatus such as an optical disk apparatus can be stabilized.

As described in the embodiment, the present invention can suppress the clock frequency relatively low by executing 8/12 conversion under (1,8) RLL conditions. Thus, a low-cost signal processor circuit can be realized.

Further, since no adjustment bit need be inserted to suppress the DC and low-frequency components of the output bit stream, the output bit stream can be used as a recording bit stream on the recording medium without reducing the effective recording capacity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data converting method comprising the steps of:
converting m-bit input data into an n-bit converted code using a first table having a conversion code group in which the number of consecutive bits "0" between bits "1" of the conversion code is limited to not less than d and not more than k, the number of consecutive bits "0" on a start side of the conversion code is limited to not more than k, and the number of consecutive bits "0" on an end side of the conversion code is limited to not more than k2;
adaptively inverting a last bit of the converted code obtained in the step of converting m-bit input data;
converting the converted code, which is obtained in the step of converting m-bit input data and the step of inverting a last bit, into an NRZI pattern in which an output is inverted for a bit "1" of the code and held for a bit "0" thereof;
cumulating bits "0" and "1" of the NRZI pattern as "−1" and "+1", respectively, thereby obtaining a cumulated value; and
performing one of following steps (a), (b) and (c) for a current code in which the number of consecutive bits "0" on the end side of the converted code is larger than (k−k1) among converted codes obtained in the step of converting m-bit input data,
(a) executing the step of inverting a last bit, when a sum of the number of consecutive bits "0" on the end side of the current code and the number of consecutive bits "0" on the start side of a next code following the current code exceeds k,
(b) inhibiting execution of the step of inverting a last bit, when the number of consecutive bits "0" on the start side of the next code is smaller than d, and
(c) when neither condition in the step (a) nor condition in the step (b) are satisfied, determining last bits of the converted code obtained in the step of converting m-bit input data, as invertible positions, and controlling execution/nonexecution of the step of inverting a last bit at each invertible position so as to decrease an absolute value of the cumulated value at a next invertible position,.

2. A method according to claim 1, wherein the step of converting m-bit input data uses a (1,8) RLL code wherein d is limited to not less than 1 and k to not more than 8.

3. A method according to claim 2, wherein k1 is limited to not more than 4 and k2 to not more than 8.

4. A method according to claim 1, wherein m, n, d, k, k1, and k2 are respectively 8, 12, 1, 8, 4, and 8.

5. A method according to claim 1, wherein the step of converting m-bit input data comprises the step of periodically inserting a sync code to the converted code.

6. A method according to claim 5, wherein the step (c) comprises controlling execution/nonexecution of the step of inverting a last bit at the invertible position so as to decrease the absolute value of the cumulated value from the invertible position up to a position at which the sync code is inserted.

7. A method according to claim 5, further comprising the step of selecting either one of a pattern having an even number of bits "1" and a pattern having an odd number of bits "1" in the sync code so as to decrease the absolute value of the cumulated value at an invertible position immediately after the position at which the sync code is inserted.

8. A method according to claim 1, wherein the step of converting m-bit input data comprises, when the sum of the number of consecutive bits "0" on the end side of the current code and the number of consecutive bits "0" on the start side of the next code following the current code among the converted codes converted by the first table is smaller than d,
converting input data into the converted code as the current code using a second table having a conversion code group which satisfies the same conditions as the code group of the first table, the code group of the second table being not included in the code group of the first table, and
converting input data into the converted code as the next code following the current code using a third table having a converted code group in which the number of consecutive bits "0" between bits "1" is limited to not less than D and not more than k, the number of consecutive bits "0" on the start side is limited to not less than d and not more than (k−d+1), and the number of consecutive bits "0" on the end side is limited to not less than D and not more than k2.

9. A method according to claim 8, wherein the step of converting m-bit input data uses a (1,8) RLL code in which d is limited to not less than 1 and k to not more than 8.

10. A method according to claim 9, wherein k1 is limited to not more than 4 and k2 to not more than 8.

11. A method according to claim 8, wherein the third table has a (1,8) RLL code in which d is limited to not less than 1, k−d+1 to not more than 8, and k2 to not more than 8.

12. A method according to claim 8, which comprises performing one of the following steps (d), (e) and (f) for a code in which the number of consecutive bits "0" on the end side of a converted code converted using the third table is larger than d,
(d) executing the step of inverting a last bit, when the sum of the number of consecutive bits "0" on the end side of the converted code and the number of consecutive bits "0" on the start end of the next code converted using the first table exceeds k,
(e) inhibiting execution of the bit inverse step, when the number of consecutive bits "0" on the start side of the next code is smaller than d, and
(f) when neither condition in the step (d) nor condition in the step (e) are satisfied, determining last bits of the converted code obtained in the step of converting m-bit input data, as invertible positions, and controlling execution/nonexecution of the step of inverting a last bit at each invertible position so as to decrease the absolute value of the cumulated value at a next invertible position.

13. A method according to claim 8, wherein m, n, d, k, k1, and k2 are respectively 8, 12, 1, 8, 4, and 8.

14. A method according to claim 8, wherein the step of converting m-bit input data comprises the step of periodically inserting a sync code to the converted code.

15. A method according to claim 14, wherein the step (c) comprises controlling execution/nonexecution of the step of inverting a last bit at the invertible position so as to decrease the absolute value of the cumulated value from the invertible position up to a position at which the sync code is inserted.

16. A method according to claim 14, further comprising the step of selecting either one of a pattern having an even number of bits "1" and a pattern having an odd number of bits "1" in the sync code so as to decrease the absolute value of the cumulated value at an invertible position immediately after the position at which the sync code is inserted.

17. A data converting apparatus comprising:
- a storage section configured to store a first table having a conversion code group in which the number of consecutive bits "0" between bits "1" of the conversion code is limited to not less than d and not more than k, the number of consecutive bits "0" on a start side of the conversion code is limited to not more than k1, and the number of consecutive bits "0" on an end side of the conversion code is limited to not more than k2, a second table having a converted code group which satisfies the same conditions as the code group of the first table, the code group of the second table being not included in the code group of the first table, and a third table having a converted code group in which the number of consecutive bits "0" between bits "1" is limited to not less than d and not more than k, the number of consecutive bits "0" on the start side is limited to not less than d and not more than (k−d+1), and the number of consecutive bits "0" on the end side is limited to not less than d and not more than k2;
- a code converter section configured to read a code from the storage section using m-bit input data as address data and converts the m-bit input data into n-bit converted code;
- an inverter section configured to adequately invert a last bit of the converted code;
- an NRZI processor section configured to convert the inverted code into an NRZI pattern in which an output is inverted for a bit "1" of the inverted code and held for a bit "0" thereof;
- an accumulator section configured to cumulate bits "0" and "1" of the NRZI pattern as "−1" and "+1", respectively, thereby obtaining a cumulated value; and
- a controller section configured to execute one of following processes (a), (b) and (c) for a current code in which the number of consecutive bits "0" on the end side of the converted code is larger than (k−k1) among n-bit converted codes obtained by the code converter,
  (a) a process of executing the step of inverting a last bit, when a sum of the number of consecutive bits "0" on the end side of the current code and the number of consecutive bits "0" on the start side of a next code following the current code exceeds k,
  (b) a process of inhibiting execution of the step of inverting a last bit, when the number of consecutive bits "0" on the start side of the next code is smaller than d, and
  a process of, when neither condition in the process (a) nor condition in the process (b) are satisfied, determining last bits of the converted code obtained in the process of converting m-bit input data, as invertible positions, and controlling execution/nonexecution of the process of inverting a last bit at each invertible position so as to decrease an absolute value of the cumulated value at a next invertible position.

18. An apparatus according to claim 17, wherein when the sum of the number of consecutive bits "0" on the end side of the current code and the number of consecutive bits "0" on the start side of the next code following the current code among the converted codes is smaller than d, the code converter section is configured to convert the input data into the converted code as the current code using the second table, and as the next code following the current code using the third table.

19. An apparatus according to claim 18, wherein the inverter section is configured to perform, for a code in which the number of consecutive bits "0" on the end side of a converted code converted using the third table is larger than d, one of the following processes (d), (e) and (f) of:
  (d) a process of inverting the last bit of the converted code, when the sum of the number of consecutive bits "0" on the end side of the converted code and the number of consecutive bits "0" on the start side of the next code converted using the first table exceeds k,
  (e) a process of inhibiting execution of the process of inverting the last bit, when the number of consecutive bits "0" on the start side of the next code is smaller than d, and
  (f) a process of determining last bits of the converted code obtained by the code converter section as invertible positions, and controlling an operation of the inverter section at each invertible position so as to decrease the absolute value of the cumulated value at a next invertible position, when neither condition in the inverting process nor condition in the inhibiting process are satisfied.

20. An apparatus according to claim 17, wherein the code converter section is configured to perform a process of periodically inserting a sync code to the converted code.

21. An apparatus according to claim 17, wherein the inverter section is configured to control an operation of the inverting at the invertible position so as to decrease the absolute value of the cumulated value from the invertible position up to a position at which the sync code is inserted.

22. An apparatus according to claim 20, further comprising a selector section which selects either one of a pattern having an even number of bits "1" and a pattern having an odd number of bits "1" in the sync code so as to decrease the absolute value of the cumulated value at an invertible position immediately after the position at which the sync code is inserted.

23. A data converting apparatus comprising:
- a code conversion section configured to convert m-bit input data into an n-bit converted code using a table having a conversion code group in which the number of consecutive bits "0" between bits "1" of the converted code, the number of consecutive bits "0" on a start side of the converted code, and the number of consecutive bits "0" on an end side of the converted code are respectively constrained;
- a inverter section configured to adaptively invert a last bit of a code obtained by the converter section;
- an NRZI converter section configured to convert the converted code obtained by the converter section and the inverter section into an NRZI pattern in which an output is inverted for a bit "1" of the code and held for a bit "0" thereof;
- an accumulator section configured to cumulate bits "0" and "1" of the NRZI pattern as "−1" and "+1", respectively, thereby obtaining a cumulated value; and
- a controller section configured to determine at least some last bits of the code obtained by the converter section as invertible positions at which the inverse of the bit is allowed, and controls execution/nonexecution of inverse at each invertible position by the inverter section so as to decrease an absolute value of the cumulated value up to a next invertible position.

* * * * *